(12) United States Patent
Champagne et al.

(10) Patent No.: US 8,798,864 B2
(45) Date of Patent: Aug. 5, 2014

(54) ROAD WHEEL DISTURBANCE REJECTION

(75) Inventors: Anthony J. Champagne, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 11 days.

(21) Appl. No.: 13/299,407

(22) Filed: Nov. 18, 2011

(65) Prior Publication Data
US 2013/0131926 A1 May 23, 2013

(51) Int. Cl.
B62D 6/00 (2006.01)
G06F 7/00 (2006.01)
G06F 17/00 (2006.01)

(52) U.S. Cl.
USPC .......................................................... 701/42

(58) Field of Classification Search
USPC .......................................................... 701/42
See application file for complete search history.

(56) References Cited

U.S. PATENT DOCUMENTS

| | | | | |
|---|---|---|---|---|
| 6,742,620 B2 * | 6/2004 | Eidam et al. | | 180/446 |
| 8,108,105 B2 * | 1/2012 | Saruwatari et al. | | 701/41 |
| 2009/0125186 A1 | 5/2009 | Recker et al. | | |
| 2009/0143938 A1 * | 6/2009 | Nishimura | | 701/41 |
| 2009/0294206 A1 * | 12/2009 | Oblizajek et al. | | 180/446 |

FOREIGN PATENT DOCUMENTS

| | | | |
|---|---|---|---|
| DE | 10344279 A1 | | 4/2004 |
| DE | 102008051552 A1 | | 4/2009 |
| DE | 102008036001 A1 | | 2/2010 |
| EP | 2 028 080 | * | 2/2009 |
| GB | 2454788 A | | 5/2009 |
| JP | 2003002222 A | | 1/2003 |

OTHER PUBLICATIONS

European Search Report for EP App. No. 12192967.3, dated Apr. 2, 2013.

* cited by examiner

*Primary Examiner* — Mary Cheung
*Assistant Examiner* — Anne Mazzara
(74) *Attorney, Agent, or Firm* — Cantor Colburn LLP

(57) ABSTRACT

A control method for an electric power steering system is provided. The control method includes evaluating wheel disturbance based on a wheel velocity. A wheel disturbance cancel amount is determined based on the wheel velocity. An assist command is generated to the power steering system based on the wheel disturbance cancel amount.

20 Claims, 5 Drawing Sheets

ROAD WHEEL DISTURBANCE REJECTION

BACKGROUND OF THE INVENTION

The present invention relates to methods and systems of a steering system, and more particularly to methods and system for rejecting road wheel disturbance in a steering system using wheel velocity.

Vehicles are subjected to some degree of disturbance in the front road wheels. Wheel imbalance is an example of road wheel disturbance. The road-wheel disturbance can cause vibrations in the handwheel that may be detectable by a driver. These types of vibrations are directly related to the road wheel rotational mean velocity. The severity of the vibration at the handwheel depends on the both the magnitude of the disturbance and the chassis and steering design. In a typical scenario, the vehicle driver will eventually take the vehicle in for service, to get, for example, the wheels balanced.

Accordingly, it is desirable to provide control methods and systems that detect and reject the presence of road wheel disturbance.

SUMMARY OF THE INVENTION

In one embodiment, a control method for an electric power steering system is provided. The control method includes evaluating wheel disturbance based on wheel velocity. A wheel disturbance cancel amount is determined based on the wheel. An assist command is generated to the power steering system based on the wheel disturbance cancel amount.

In another embodiment, a control system for a power steering system is provided. The control system includes a first module that evaluates a wheel disturbance based on a wheel velocity and that determines a wheel disturbance cancel amount based on the wheel velocity. A second module generates an assist command to the power steering system based on the wheel disturbance cancel amount.

In another embodiment, a system for determining road wheel disturbance in a vehicle is provided. The system includes an electric power steering system. A control module evaluates wheel disturbance based on wheel velocity, determines a wheel disturbance cancel amount based on the wheel velocity; and generates an assist command to the power steering system based on the wheel disturbance cancel amount.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
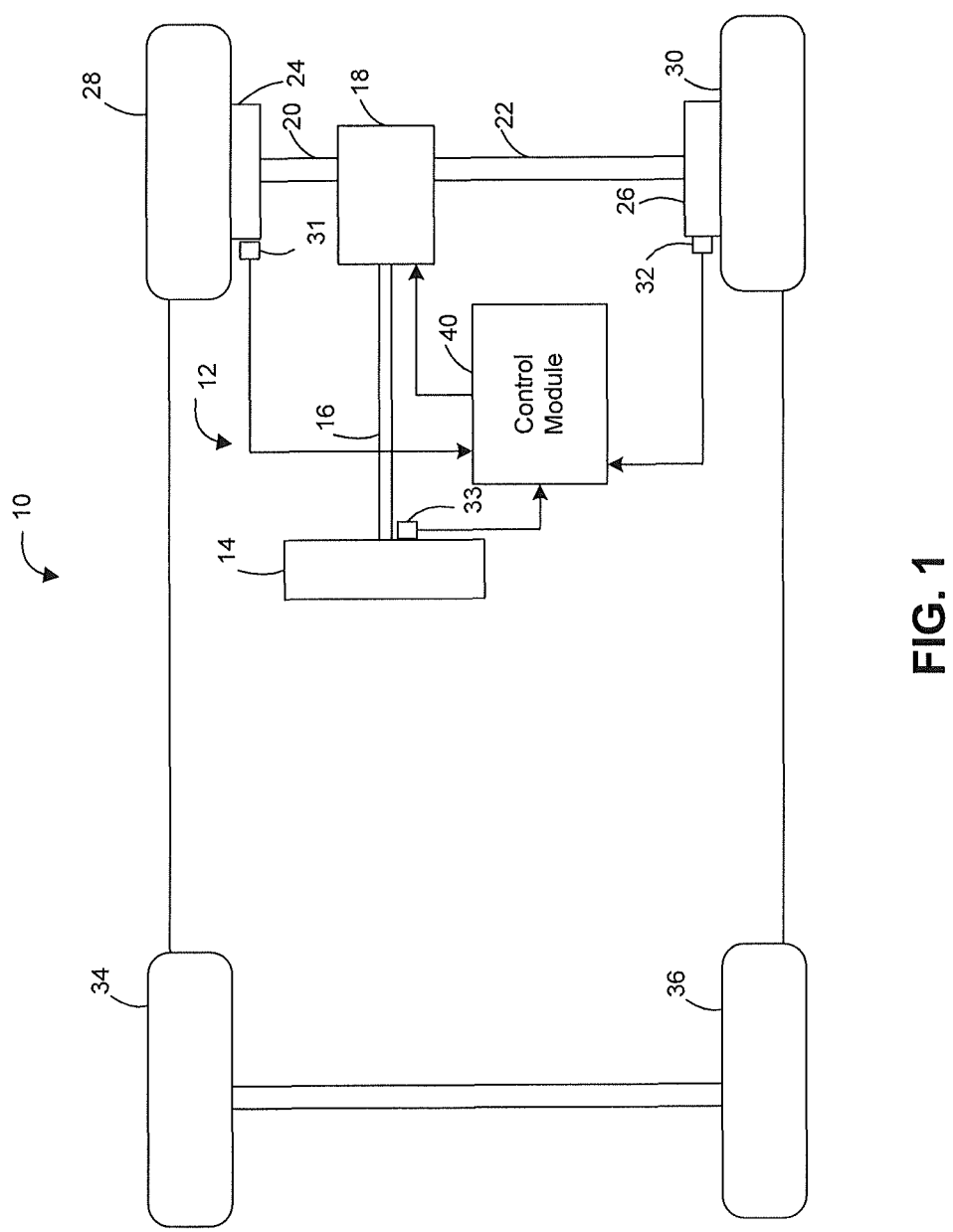
FIG. 1 is a functional block diagram illustrating a vehicle including an electric power steering control system in accordance with an exemplary embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. For exemplary purposes, the disclosure will be discussed in the context of the sensors 31, 32 that are associated with the front wheels 28, 30, respectively. As can be appreciated, other wheel sensors that sense wheel movement, such as wheel position sensors, may be used in place of the wheel speed sensors. In such a case, a wheel velocity may be calculated based on the wheel sensor signal. In another example, the sensor 33 is a torque sensor that senses a torque placed on the handwheel 14. The sensor 33 generates torque signals based thereon.

A control module 40 controls the operation of the steering system 12 based on one or more of the sensor signals and further based on the steering control systems and methods of the present disclosure. Generally speaking, the steering control systems and methods of the present disclosure evaluate the wheel speed signals to determine road wheel disturbance. In various embodiments, the steering control systems and methods identify a portion of the wheel speed signal that has variation related to wheel disturbance, evaluate that portion, and generate a compensation torque command based on the portion.

Figure 2:
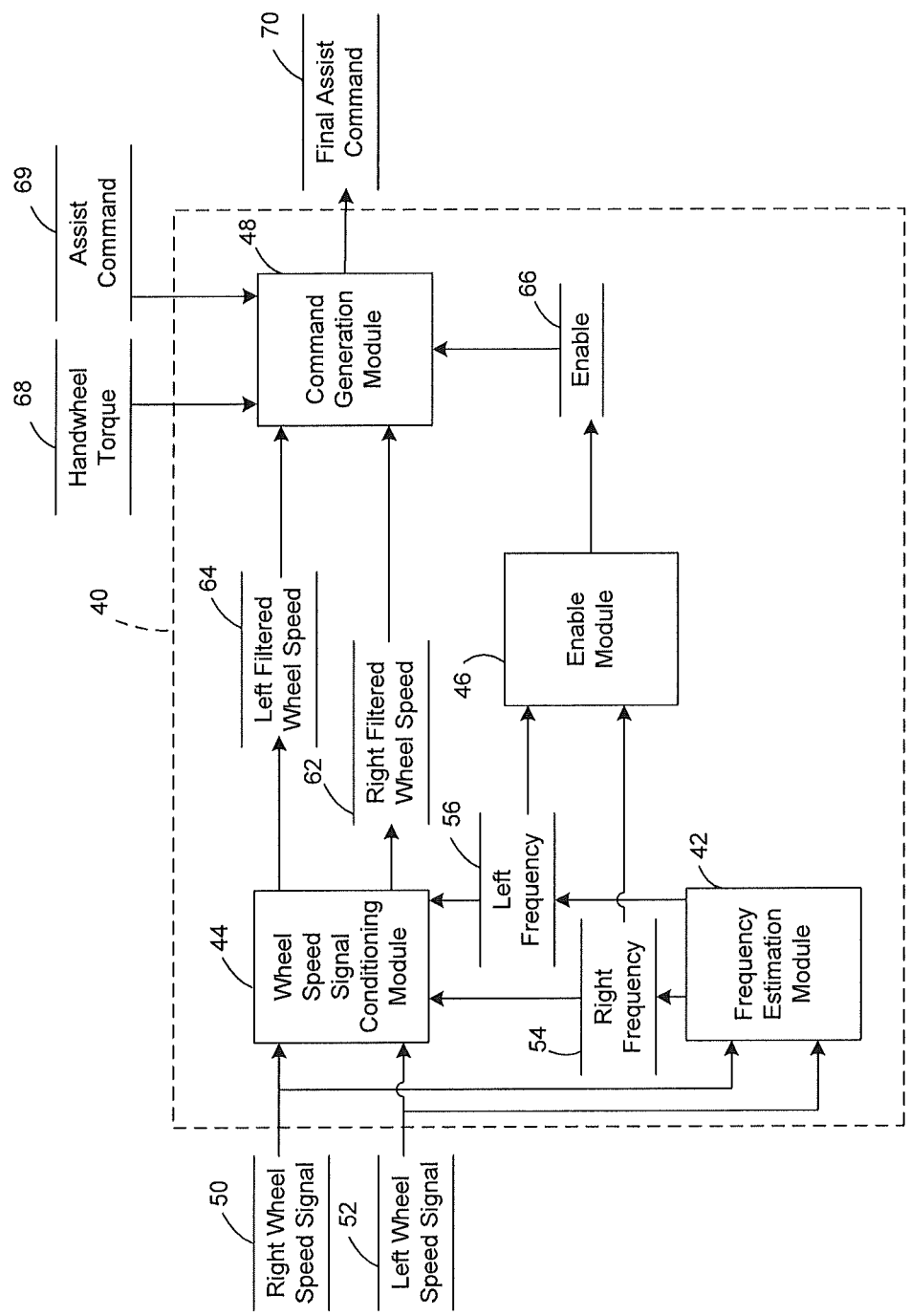
FIG. 2 is a dataflow diagram illustrating the electric power steering control system in accordance with another exemplary embodiment of the invention.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly control road wheel disturbance at the handwheel based on wheel speed signals. Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes a frequency estimation module 42, a wheel speed signal conditioning module 44, an enable module 46, and a command generation module 48.

The frequency estimation module 42 receives as input a right wheel speed signal 50 and a left wheel speed signal 52. The frequency estimation module estimates a frequency 54, 56 for each wheel speed signal 50, 52, respectively. For example, the frequencies 54, 56 can be estimated by scaling the wheel speed signals 50, 52 by: frequency=K/(2*$\pi$) (i.e., based on the relation: $\omega$=2*$\pi$*frequency). In various embodiments, K is equal to one when the frequency is a first order disturbance, but may also take on other values, such as two, in the case of a second order disturbance. The frequency estimation module 42 may then apply a lowpass filter or other noise reduction filter (not shown) to the scaled wheel speed signals to provide the frequencies 54, 56.

The wheel speed signal conditioning module 44 receives as input the wheel speed signals 50, 52, and the frequencies 54, 56. The wheel speed signal conditioning module 44 preconditions the wheel speed signals 50, 52 to generate filtered wheel speed signals 62, 64 using the frequencies 54, 56. As can be appreciated, various filtering techniques may be used to perform the conditioning. In various embodiments, a bandpass filter may be applied with a specified center frequency.

Figure 3A:
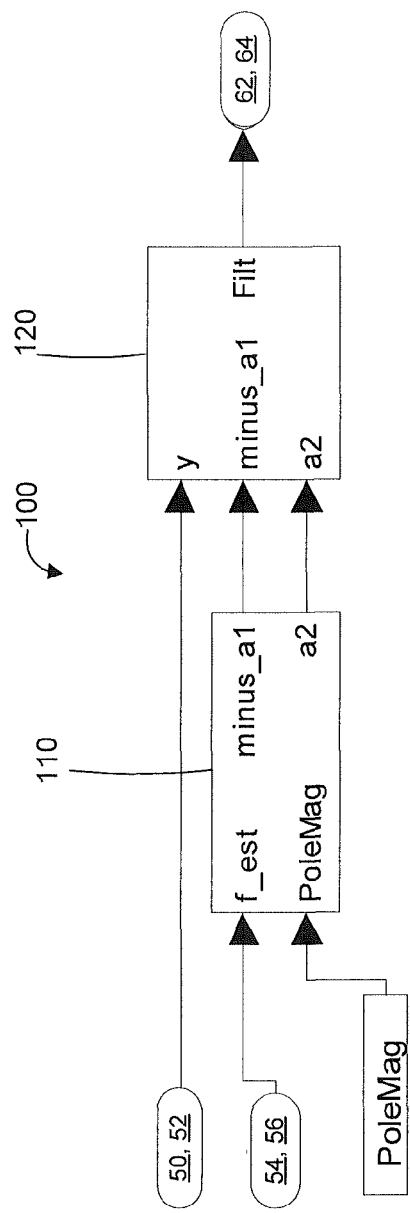
FIGS. 3A-3C, and 4 are models illustrating exemplary electric power steering control methods and systems in accordance with yet another exemplary embodiment of the invention.
Figure 3B:
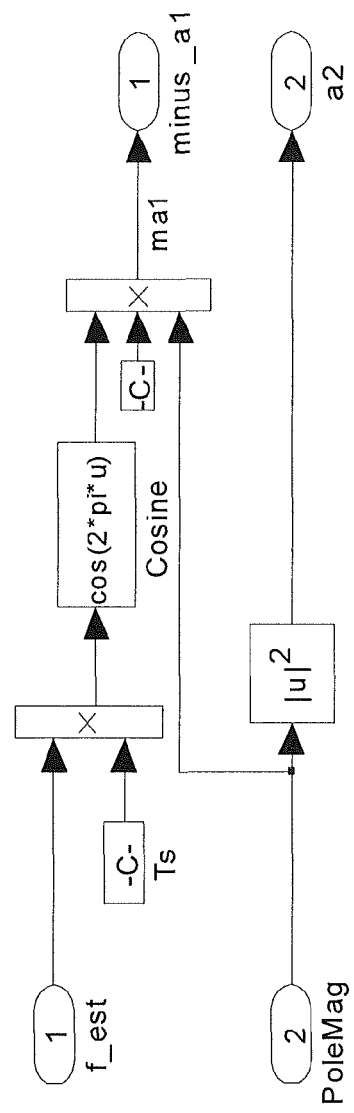
Figure 3C:
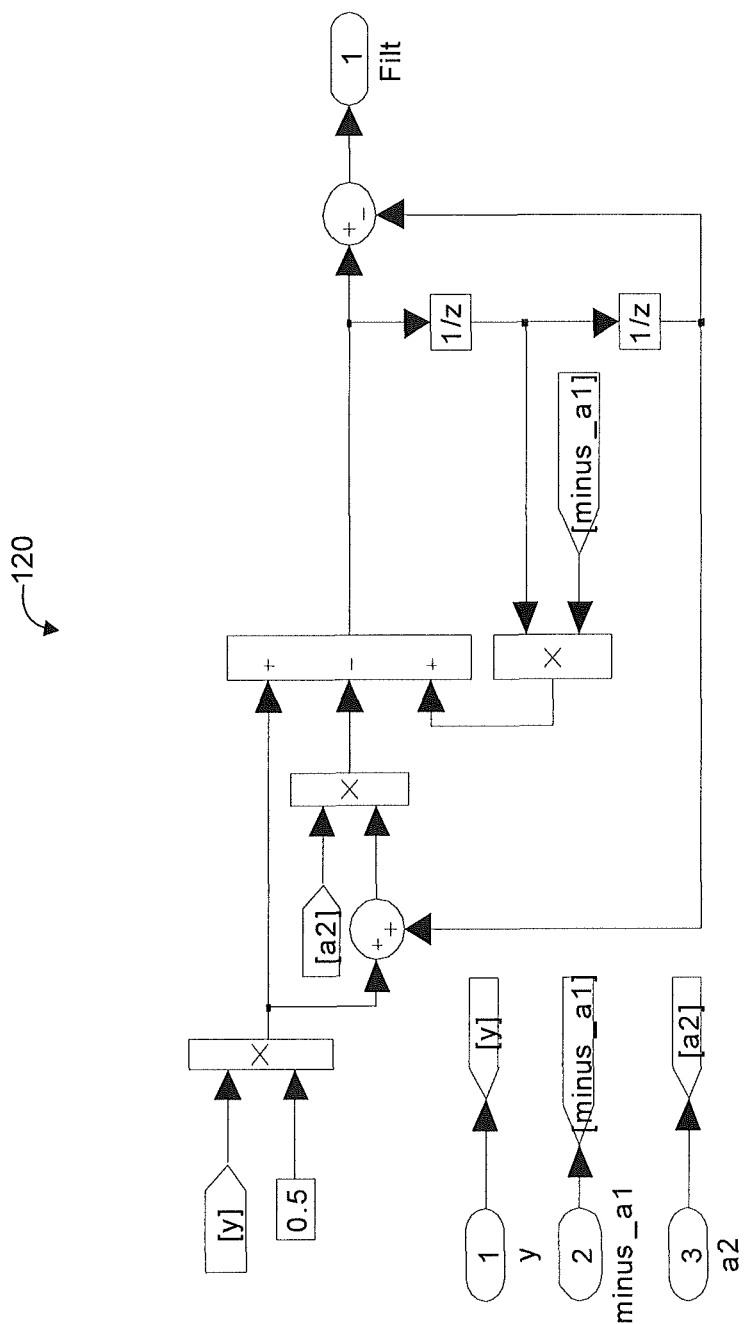

For example, as shown by the filtering methods in FIGS. 3A, 3B, and 3C, a narrowband transfer function may be applied to the wheel speed signals 50, 52. In the example, filter coefficients (minus_a1 and a2) can be calculated using the calculation method 110 (e.g., as shown in FIG. 3B), based on the frequency 54, 56 (f_est) where PoleMag is a constant used to adjust the filter bandwidth. A unity gain resonator method 120 (e.g., as shown in FIG. 3C) can be performed to filter the wheel speed signals 50, 52 based on the filter coefficients.

With reference back to FIG. 2, the enable module 46 receives as input the frequencies 54, 56. The enable module 46 enables the assist determination based on the frequencies 54, 56 by generating an enable status 66. For example, the enable module 46 determines an average of the frequencies 54, 56. The enable module 46 then sets the enable status 66 as a function of the average. For example, a lookup table (not shown) may be used to output the enable status 66 based on the average.

The command generation module 48 receives as input the filtered wheel speed signals 62, 64, the enable status 66, handwheel torque 68, and an assist command 69. As can be appreciated, the assist command 69 can include an assist value that is determined based on other operating conditions of the steering system 12 (FIG. 1).

Based on the inputs, the command generation module 48 generates a final assist command 70 that is used to control the motor of the steering assist unit 18 (FIG. 1). In various embodiments, the command generation module 48 determines a disturbance cancel amount by computing a cancel command for each filtered wheel speed signal 62, 64; summing the cancel commands; and applying a scaling to the sum. The command generation module 48 then applies the cancel command to the assist command 69 and outputs the final assist command 70.

Figure 4:
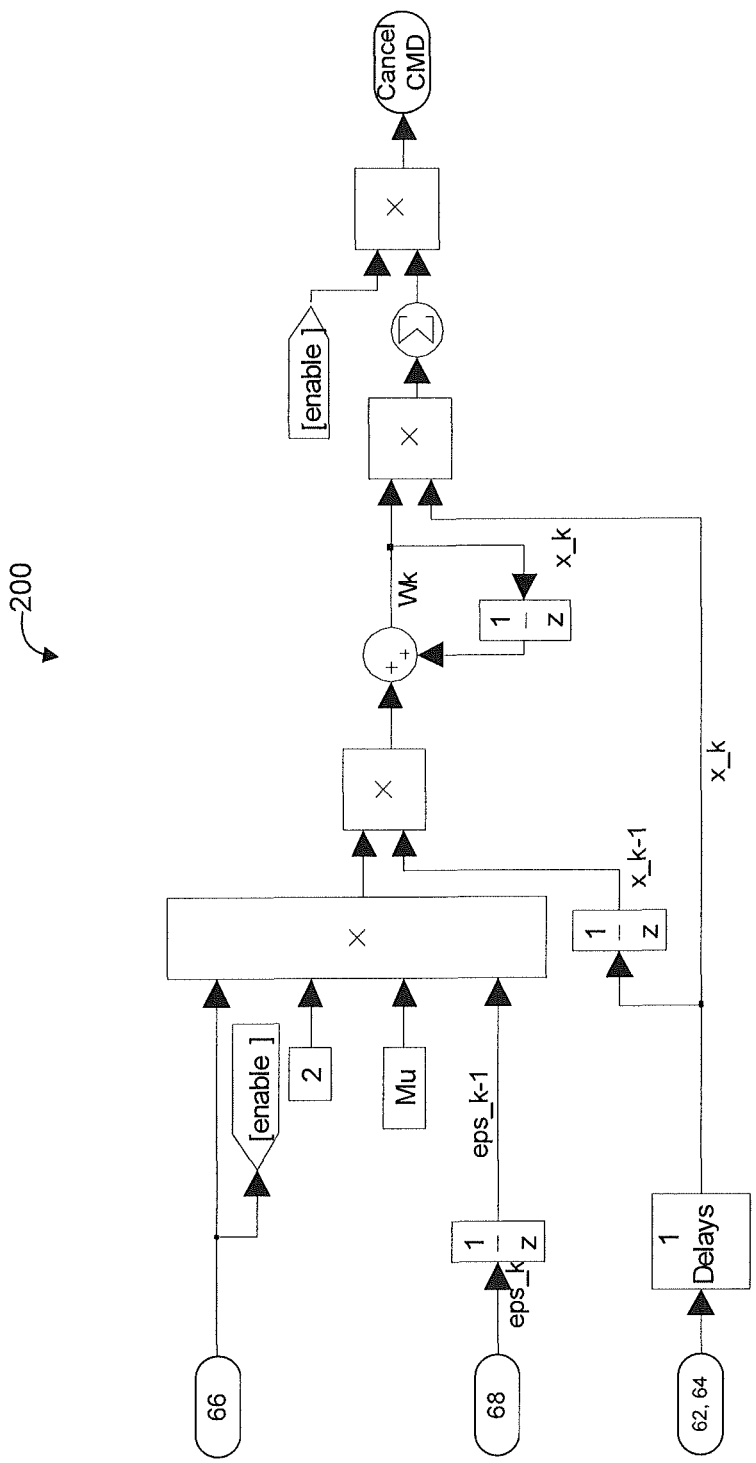

In various embodiments, the command generation module 48 computes the cancel command using an adaptive filter method 200 (FIG. 4). For example, as shown in FIG. 4, the handwheel torque 68 can be used as an error signal for learning. The filtered wheel speed signals 62, 64 can be the reference signal. Learning can be active when the enable status 66 is non-zero. The enable status 66 is commonly one when learning is desired, although other values may be used if additional frequency scaling is desired. The filtered wheel speed 62, 64 is filtered by multiplying the elements of vectors x_k times those of W_k and then summing the results. The number of elements in the vectors can be predetermined. The filter learning speed can be controlled by constant Mu multiplied by 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system, comprising:
   a first module that evaluates a wheel disturbance based on a wheel velocity and that determines a wheel disturbance cancel amount based on a handwheel torque and a filtered wheel velocity generated by applying a filter to the wheel velocity, the filter based on a frequency of a variation of a wheel sensor signal indicating the wheel velocity; and
   a second module that generates a final assist command to the power steering system based on the wheel disturbance cancel amount and the filtered wheel velocity.

2. The system of claim 1, wherein the first module determines the wheel disturbance cancel amount by applying an adaptive filter to the filtered wheel velocity, the adaptive filter configured to receive the handwheel torque as an error signal and receive the filtered wheel velocity as a reference signal.

3. The system of claim 1, wherein the wheel velocity is determined from a wheel sensor signal and the filtered wheel velocity is determined by applying the filter to the wheel sensor signal to generate a filtered wheel sensor signal.

4. The system of claim 3, wherein the second module determines the wheel disturbance cancel amount by computing a cancel command using the filtered wheel sensor signal and applying a scaling to the cancel command.

5. The system of claim 1, wherein the second module determines the final assist command by applying the wheel disturbance cancel amount to an assist command.

6. The system of claim 1, wherein the second module determines the wheel disturbance cancel amount based on an adaptive filtering method.

7. The system of claim 6, wherein an error signal of the adaptive filtering method is based on handwheel torque.

8. The system of claim 6, wherein a reference signal of the adaptive filtering method is based on a filtered wheel signal that indicates wheel velocity.

9. A control method for an electric power steering system, comprising:
- evaluating a wheel disturbance based on a filtered wheel velocity received as an input by a control module, the filtered wheel velocity generated by applying a filter to a wheel velocity, the filter based on a frequency of a variation of a wheel sensor signal indicating the wheel velocity;
- determining a wheel disturbance cancel amount based on a handwheel torque and the filtered wheel velocity by the control module; and
- generating a final assist command to the power steering system based on the wheel disturbance cancel amount by the control module.

10. The control method of claim 9, wherein determining the wheel disturbance cancel amount includes applying an adaptive filter to the filtered wheel velocity, the adaptive filter configured to receive the handwheel torque as an error signal and receive the filtered wheel velocity as a reference signal.

11. The control method of claim 9, wherein the wheel velocity is determined from a wheel sensor signal and the filtered wheel velocity is determined by applying the filter to the wheel sensor signal to generate a filtered wheel sensor signal.

12. The control method of claim 11, wherein the determining the wheel disturbance cancel amount includes computing a cancel command using the filtered wheel sensor signal, and applying a scaling to the cancel command.

13. The control method of claim 9, wherein the determining the final assist command includes applying the wheel disturbance cancel amount to an assist command.

14. The control method of claim 9, wherein determining the wheel disturbance cancel amount is based on an adaptive filtering method.

15. The control method of claim 14, wherein an error signal of the adaptive filtering method is based on handwheel torque.

16. The control method of claim 14, wherein a reference signal of the adaptive filtering method is based on a filtered wheel speed signal that indicates wheel velocity.

17. A system for determining road wheel disturbance in a vehicle, comprising:
- an electric power steering system; and
- a control module that evaluates wheel disturbance based on a wheel velocity, that receives as an input a handwheel torque and a filtered wheel velocity generated by applying a filter to the wheel velocity, the filter based on a frequency of a variation of a wheel sensor signal indicating the wheel velocity, that determines a wheel disturbance cancel amount based on the filtered wheel velocity, that generates an assist command to the power steering system based on the wheel disturbance cancel amount.

18. The system of claim 17, wherein the control module determines the wheel disturbance cancel amount by applying an adaptive filter to the filtered wheel velocity, the adaptive filter configured to receive the handwheel torque as an error signal and receive the filtered wheel velocity as a reference signal.

19. The system of claim 17, wherein the second module determines the wheel disturbance cancel amount based on an adaptive filtering method.

20. The system of claim 19, wherein an error signal of the adaptive filtering method is based on a handwheel torque, and a reference signal of the adaptive filtering method is based on a filtered wheel signal that indicates wheel velocity.

\* \* \* \* \*